Feb. 25, 1941.   L. LIMPRECHT   2,232,859
AUTOMOBILE WHEEL
Filed Nov. 10, 1938
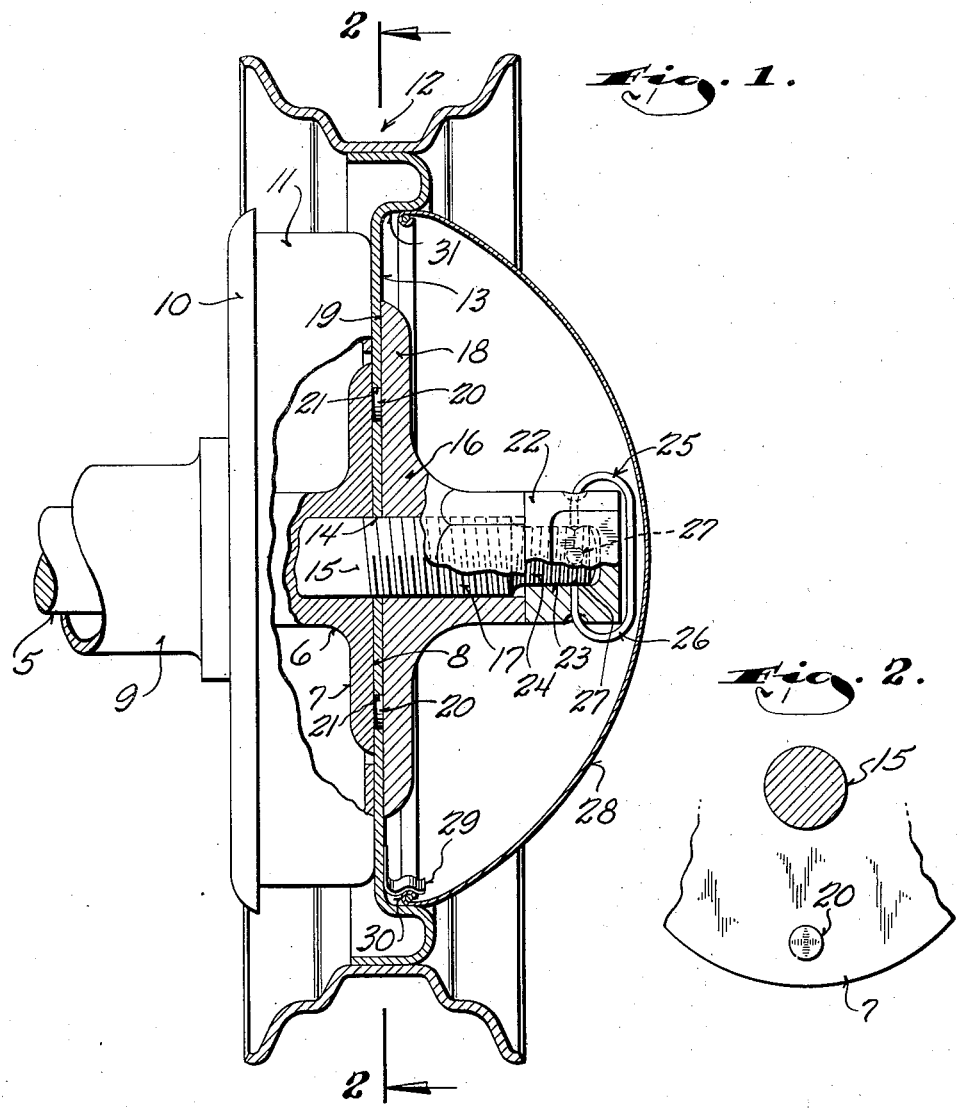
Inventor
Leslie Limprecht Patented Feb. 25, 1941

2,232,859

UNITED STATES PATENT OFFICE 2,232,859

AUTOMOBILE WHEEL

Leslie Limprecht, Sheboygan, Wis.

Application November 10, 1938, Serial No. 239,752

1 Claim. (Cl. 301—9)

This invention relates to wheels, and refers particularly to automobile wheels.

It is an object of this invention to provide an improved and simplified manner of removably securing an automobile wheel in position so as to obviate the usual plurality of clamping nuts.

Another object of this invention is to provide a stronger attachment for the wheel and at the same time reduce the number of parts required for the connection.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claim.

The accompanying drawing illustrates one complete example of the physical embodiment of the invention constructed in accordance with the best mode so far devised for the practical application of the principles thereof, and in which:

Figure 1 is a vertical sectional view through a wheel constructed in accordance with this invention; and Figure 2 is a detail sectional view taken on the line of the line 2—2 in Figure 1.

Referring now particularly to the accompanying drawing in which like numerals indicate like parts, the numeral 5 designates a wheel axle to which a hub 6 is secured. The hub has a flange 7, the outer face 8 of which is flat and has substantial area.

The axle 5 is enclosed within a stationary axle housing 9 which carries a disc 10 upon which the brake mechanism (not shown) is mounted. This brake mechanism cooperates with a brake drum 11 on the wheel 12.

The wheel 12 has a central web portion 13 apertured as at 14 to receive a spindle 15 which projects axially from the surface 8 of the hub. The spindle may be the outer end portion of the axle 5. It is to be observed that the web portion 13 of the wheel lies flat against the surface 8 of the hub where it is held by a nut 16 threaded onto the spindle 15 with a right-hand thread 17.

The nut 16 has a flange 18 at least coextensive in area with the surface 8 and its inner face 19 engages against the outer flat surface of the web portion 13 to clamp the wheel between the nut and the hub. By having a large portion of the wheel thus securely clamped between the hub and the securing nut, it follows that the wheel is securely locked in position, and while the frictional contact between the clamping surfaces is sufficient to drivingly connect the wheel with the axle, positive assurance against rotation of the wheel with respect to the axle is provided by the engagement of two diametrically opposed dowels 20 projecting from the surface 8 of the hub into holes 21 formed in the web 13. These dowels 20, however, are no longer than the thickness of the web 13.

Accidental retrograde rotation of the clamping nut 16 is prevented by a locking nut 22 threaded onto a reduced extension 23 on the outer end of the spindle with a left-hand thread 24. The locking nut 22 bears against the outer end of the nut 16 and thus securely holds the same against retrograde rotation.

A detent locking mechanism 25 is preferably carried by the locking nut 22 to secure it against displacement. This detent device comprises a spring loop 26 having its ends projecting through holes in the nut to engage in notches or recesses 27 formed in the spindle extension 23.

For the sake of appearance, the wheel mounting mechanism is enclosed within a hub cap or cover 28, which may be secured in position by spring clips 29, only one of which is shown, carried by the wheel 12 and engaging over a bead 30 extending about the peripheral edge of the cover 28, it being noted that the peripheral portion of the cap or cover fits into the cupped portion 31 of the wheel.

From the foregoing description taken in connection with the accompanying drawing, it will be readily apparent that this invention provides an exceedingly simple manner of securing an automobile wheel in position, and that an exceptionally strong construction is provided.

What I claim as my invention is:

In combination: a wheel axle; a shoulder spaced from one end of said axle and providing an outwardly facing upright surface of substantial area; a wheel having a flat web portion apertured to receive the end of the axle and lying flat against said surface of the shoulder; interengaging means carried by said shoulder and web for securing the wheel against relative rotation with respect to the axle and for centering the wheel on the axle; a part associated with said outer end of the axle having a large flat surface engaging the web portion of the wheel to clamp the same between it and the flat surface of the shoulder and thereby maintain said interengaging means operative; a threaded connection between said part and the outer end portion of the axle providing for tightening said part against the web of the wheel to maintain the hub portion of the wheel frictionally engaged with said shoulder; a nut threaded onto said end of the axle outwardly if said part with a thread opposite that which secures said part to the axle and engaging said part to lock the same against accidental detachment; and a spring detent passing through opposite sides of the nut and engaged in recesses in the adjacent surface of said end of the axle for securing said nut against retrograde rotation, said detent cooperating with said part and the interengaging means on the shoulder and wheel web to detachably but positively maintain the wheel drivingly connected with the axle.

LESLIE LIMPRECHT.